(12) United States Patent
Andrieu

(10) Patent No.: US 10,334,361 B1
(45) Date of Patent: Jun. 25, 2019

(54) SPEAKER DRIVER CIRCUITRY

(71) Applicant: Cirrus Logic International Semiconductor Ltd., Edinburgh (GB)

(72) Inventor: Cedric Andrieu, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/964,931

(22) Filed: Apr. 27, 2018

Related U.S. Application Data

(60) Provisional application No. 62/598,050, filed on Dec. 13, 2017.

(51) Int. Cl.
    H04R 3/00    (2006.01)
    H04R 29/00   (2006.01)
    B06B 1/02    (2006.01)
    H04R 1/02    (2006.01)

(52) U.S. Cl.
    CPC .......... *H04R 3/007* (2013.01); *B06B 1/0276* (2013.01); *H04R 1/02* (2013.01); *H04R 29/001* (2013.01); *H04R 2201/028* (2013.01); *H04R 2499/11* (2013.01); *H04R 2499/15* (2013.01)

(58) Field of Classification Search
    None
    See application file for complete search history.

(56) References Cited

U.S. PATENT DOCUMENTS

| | | | | |
|---|---|---|---|---|
| 5,758,173 A | * | 5/1998 | Evoy | G06F 1/1637 713/320 |
| 2007/0170984 A1 | * | 7/2007 | Andersen | H03F 1/3264 330/10 |
| 2015/0085620 A1 | * | 3/2015 | Macours | H03G 3/3005 367/199 |
| 2016/0241966 A1 | * | 8/2016 | Pompei | H04R 19/02 |

* cited by examiner

*Primary Examiner* — Paul W Huber
(74) *Attorney, Agent, or Firm* — Jackson Walker L.L.P.

(57) ABSTRACT

A loudspeaker driver circuit, comprises: at least one input for receiving an input signal; a loudspeaker protection module coupled to the input for receiving the input signal and for generating a modified signal in response to the input signal; an amplifier coupled to receive the modified signal from the loudspeaker protection module and to generate an output signal; an output for outputting the output signal for driving a speaker; and an ultrasonic signal generator, for generating an ultrasonic signal, wherein the ultrasonic signal generator is coupled to the amplifier for applying the ultrasonic signal thereto.

38 Claims, 7 Drawing Sheets

US 10,334,361 B1

SPEAKER DRIVER CIRCUITRY

TECHNICAL FIELD

Embodiments described herein relate to speaker driver circuitry.

BACKGROUND

Many devices include loudspeakers, which are used to play sounds to a user of the device, based on an input signal. For example, the input signal may be derived from a signal that has been received by the device over a communications link, in the case of a phone call or the like, or may be derived from stored data, in the case of music or speech playback. In many situations, it is desirable to ensure that the signal that is applied to the loudspeaker does not cause damage to the loudspeaker. Thus loudspeaker protection circuitry is commonly used.

It is also known to use the loudspeaker of a device such as a smartphone to produce ultrasonic sounds, for example so that any reflected ultrasonic signal can be used for detecting whether the device is in close proximity to another body.

It is known to provide the loudspeaker protection functionality and ultrasonic pulse generation circuitry in a processor device, and to generate a signal that is then passed to a separate loudspeaker driver circuit.

SUMMARY

According to an aspect of the invention, there is provided a loudspeaker driver circuit, comprising:
  at least one input for receiving an input signal;
  a loudspeaker protection module coupled to the input for receiving the input signal and for generating a modified signal in response to the input signal;
  an amplifier coupled to receive the modified signal from the loudspeaker protection module and to generate an output signal;
  an output for outputting the output signal for driving a speaker; and
  an ultrasonic signal generator, for generating an ultrasonic signal, wherein the ultrasonic signal generator is coupled to the amplifier for applying the ultrasonic signal thereto.

According to a second aspect of the invention, there is provided an audio processor circuit, comprising:
  a source of an audio signal;
  at least one output for connection to a loudspeaker driver circuit; and
  an ultrasonic information generator, for generating ultrasonic information that can be used by an ultrasonic processing module for generating an ultrasonic signal in response thereto,
  wherein the audio signal and the ultrasonic information are applied to the at least one output.

According to another aspect of the present invention, there is provided a device comprising such a loudspeaker driver circuit and/or such an audio processor circuit. The device may comprise a mobile telephone, an audio player, a video player, a mobile computing platform, a games device, a remote controller device, a toy, a machine, or a home automation controller or a domestic appliance.

According to another aspect of the invention, there is provided a method of operation of a loudspeaker driver circuit, wherein the loudspeaker driver circuit comprises: at least one input for receiving an input signal; a loudspeaker protection module coupled to the input for receiving the input signal and for generating a modified signal in response to the input signal; an amplifier coupled to receive the modified signal from the loudspeaker protection module and to generate an output signal; and an output for outputting the output signal for driving a speaker; the method comprising generating an ultrasonic signal, and applying the ultrasonic signal to the amplifier.

According to another aspect of the present invention, there is provided a computer program product, comprising a computer-readable tangible medium, and instructions for performing a method according to the previous aspect.

According to another aspect of the present invention, there is provided a non-transitory computer readable storage medium having computer-executable instructions stored thereon that, when executed by processor circuitry, cause the processor circuitry to perform a method according to the previous aspect.

BRIEF DESCRIPTION OF DRAWINGS

For a better understanding of the present invention, and to show how it may be put into effect, reference will now be made to the accompanying drawings, in which.

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein can be implemented in a wide range of devices and systems. However, for ease of explanation of one embodiment, an illustrative example will be described, in which the implementation occurs in a smartphone.

Figure 1:
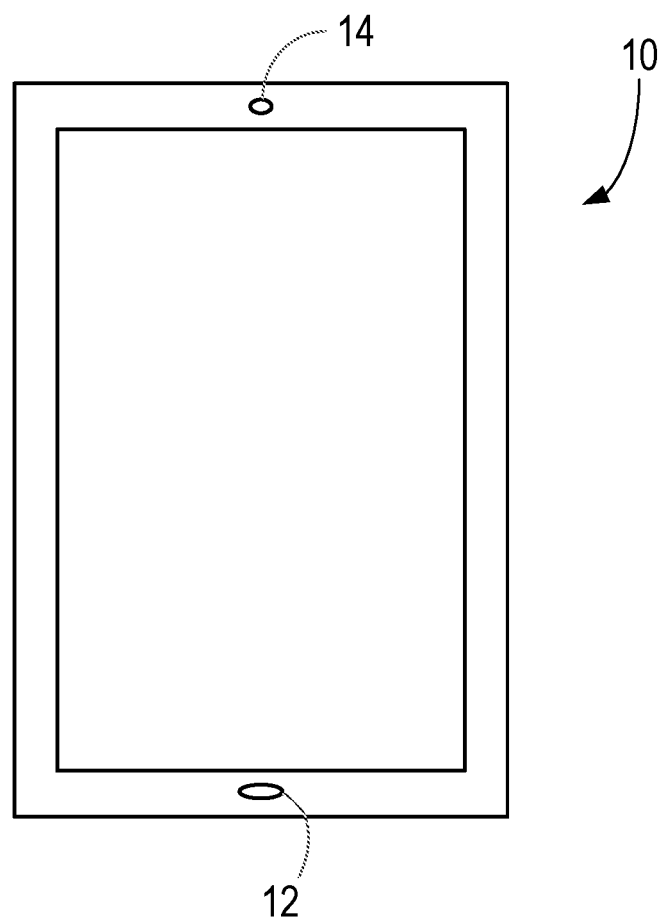
—
  FIG. 1 illustrates a smartphone.

FIG. 1 illustrates a smartphone 10, having a microphone 12 for detecting ambient sounds. In normal use, the microphone is of course used for detecting the speech of a user who is holding the smartphone 10 close to their face. In addition, the smartphone 10 has a loudspeaker 14, for producing sounds that can be heard by the user. It will be appreciated that the smartphone 10 may have multiple microphones and/or multiple loudspeakers, but these are unnecessary for an understanding of the invention.

As usual in a smartphone, the microphone 12 may be used for detecting the user's speech, for example to be transmitted over a wireless interface in a voice call, or to be interpreted as a voice command for the smartphone. Similarly, the loudspeaker 14 may be used for playing back sounds received over the wireless interface in a voice call, or for playing back recorded music etc. In addition, embodiments described herein are particularly concerned with ultrasonic signal generation and detection. Thus, ultrasound signals, typically in the form of pulses, are generated, and played through the loudspeaker 14. Echoes of these signals are detected by the microphone 12. An ultrasonic processor compares the detected signals with the signals that were transmitted, and makes some deduction. For example, one use of such embodiments is in proximity detection, that is to say, determining whether the smartphone is close to another object, which may be the user's face. The ultrasonic processor then compares the times of arrival of the detected signals with the times at which the signals were transmitted, and from that comparison is able to determine the distance to the object from which the signals were reflected.

Figure 2:
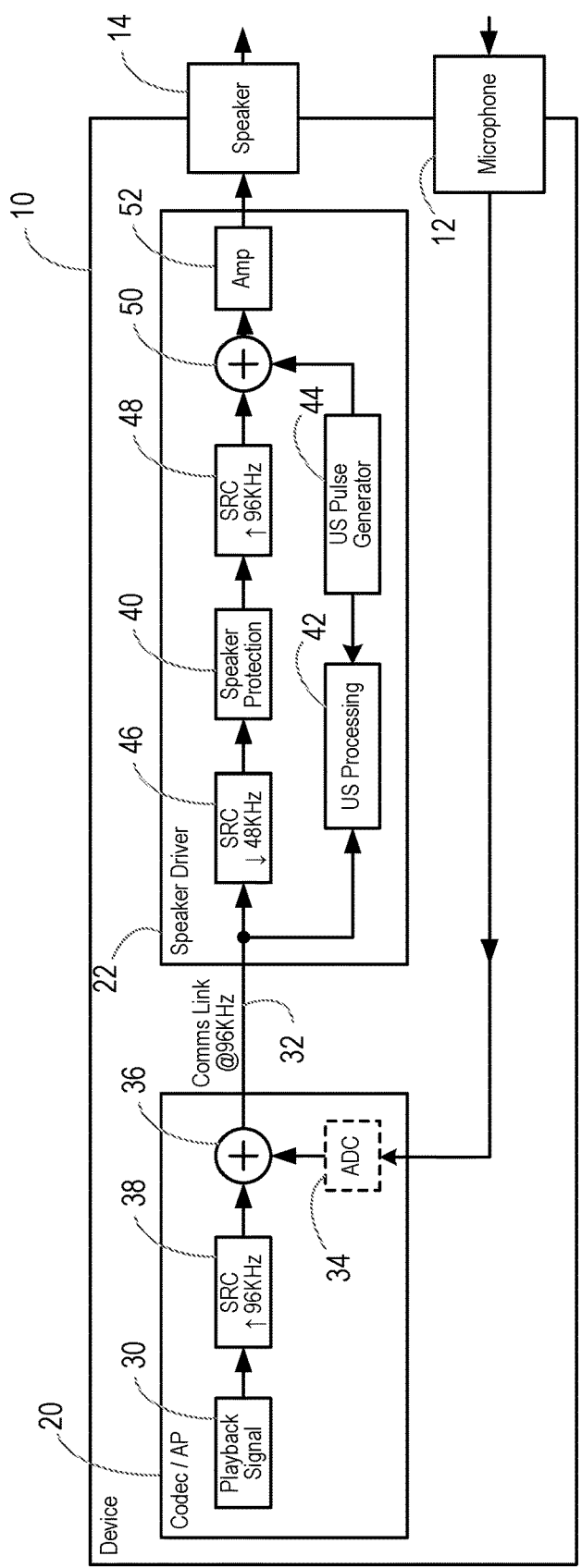
FIG. 2 is a schematic diagram, illustrating an embodiment of audio processing circuitry in the smartphone.

FIG. 2 illustrates a part of an audio signal processing system in a device 10, which may for example be a smartphone as shown in FIG. 1. However, the device 10 may equally be any suitable device, such as any mobile telephone, an audio player, a video player, a mobile computing platform, a games device, a remote controller device, a toy, a machine, or a home automation controller or a domestic appliance.

In this example, the device 10 has a loudspeaker 14 for playing sounds generated within the device, and a microphone 12 for detecting sounds.

The device 10 comprises two integrated circuits that are used for processing sound signals, namely a codec or applications processor 20, and a speaker driver circuit 22.

The codec or applications processor 20 includes a source 30 of a wanted playback signal. For example, the source 30 might be a memory containing stored audio signals. Alternatively, or additionally, the source 30 might be connected to transceiver circuitry, for producing a wanted signal from a signal received over a telecommunications or wireless connection, for example during a voice call.

Typically, the source 30 produces the playback audio signal at a sampling rate of 44.1 kHz or 48 kHz. This playback signal is passed over a communications link 32 within the device 10 to the loudspeaker driver circuit 22.

In addition, the signal that is passed over the communications link 32 to the loudspeaker driver circuit 22 includes information about the ultrasonic signal detected by the microphone 12.

In this embodiment, a feedback signal from the microphone 12 is connected to the codec or applications processor 20. This feedback signal is passed to an optional analog-digital converter 34, and the digital feedback signal is added to the playback signal by means of an adder 36. In this example, the feedback signal contains the reflected ultrasonic signal, as detected by the microphone 12.

In order to ensure that the signal that is passed over the communications link 32 includes the full information content of the feedback signal, the communications link 32 operates at a sampling rate that is high enough to carry this information. In this example, the sampling rate of the link from the microphone 12 to the processor 20, and the sampling rate of the communications link 32, is 96 kHz.

Therefore, the playback signal produced by the source 30 is passed to a sample rate converter 38 to increase its sampling rate to 96 kHz before it is passed to the adder 36 and over the communications link 32, which may for example be an I²S bus.

The signal that is passed over the communications link 32 to the loudspeaker driver circuit 22 is passed to speaker protection circuitry 40 and to an ultrasonic processing module. In this example, the ultrasonic processing module includes an ultrasonic processing block 42, for extracting the required ultrasonic signal information from the input signal, and an ultrasonic pulse generator 44 for generating an ultrasonic pulse signal. The signal generated by the ultrasonic pulse generator 44 is also passed to the ultrasonic processing block 42, which is therefore able to compare the transmitted signal with the detected reflected signal, in order to obtain useful information.

As noted above, the ultrasonic signal information and the ultrasonic pulse signal have a sampling rate of 96 kHz, in order to ensure that they include the required full information content of the signals in the ultrasonic frequency band.

However, it is unnecessary to operate the speaker protection block 40 at such a high sampling rate. Therefore, the signal that is received by the loudspeaker driver circuit 22 over the communications link 32 is passed to a sample rate controller 46, where it is down-sampled to a sampling rate of 48 kHz in this example, before it is passed to the speaker protection circuitry 40.

The speaker protection circuitry 40 generates a modified signal, taking account of any properties of the loudspeaker 14 that mean that the specific input signal might cause overheating of the loudspeaker (or any other damage thereto), or that might mean that the loudspeaker 14 is unable to reproduce the signal without clipping or introducing other types of distortion.

The modified signal generated by the speaker protection circuitry 40 is then passed to a further sample rate controller 48, where it is up-sampled to a sampling rate of 96 kHz.

The modified signal generated by the speaker protection circuitry 40, and the ultrasonic pulse signal generated by the ultrasonic pulse generator 44, both having a sampling rate of 96 kHz, are then passed to an adder 50, where they are summed, and passed to an amplifier 52, before being output from the loudspeaker driver circuitry 22 to the loudspeaker 14.

As mentioned above, the ultrasonic signal can for example be used in proximity detection, i.e. determining whether the device is close to a surface such as the user's head, by detecting the form of the reflected signals that are detected by the microphone 12, and comparing these with the transmitted signals.

Figure 3:
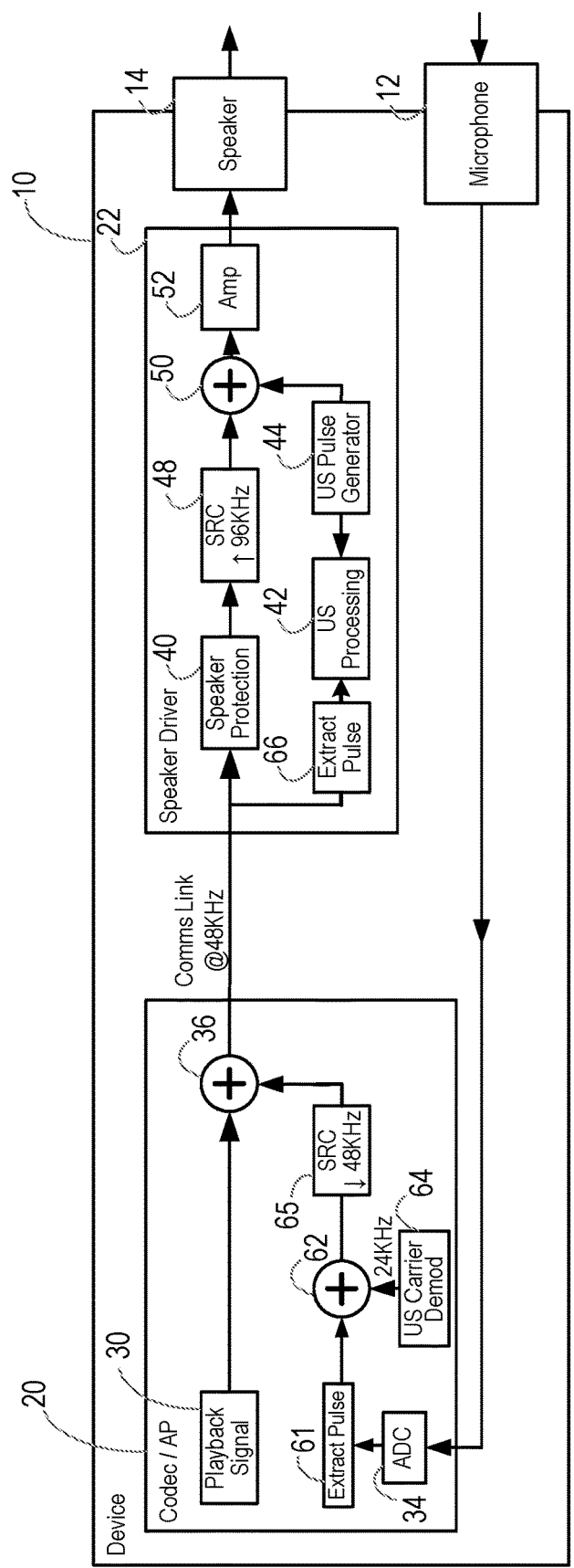
FIG. 3 is a schematic diagram, illustrating an alternative embodiment of audio processing circuitry in the smartphone.

FIG. 3 illustrates an alternative embodiment of a part of an audio signal processing system in a device 10. The system shown in FIG. 3 is similar to that shown in FIG. 2, and components having the same functions are indicated by the same reference numerals.

In the embodiment shown in FIG. 3, the communications link 60 between the codec or applications processor 20, and the loudspeaker driver circuit 22, operates at a sampling rate of 48 kHz. Again, the communications link 60 may for example be an I²S bus.

In order to generate suitable ultrasonic signal information that can be transmitted at the sampling rate of 48 kHz, the feedback signal from the microphone 12 that is connected to the codec or applications processor 20 is passed to the optional analog-digital converter 34, and then to a pulse extraction block 61. The extracted pulse is passed to a mixer 62, where it is mixed with a 24 kHz ultrasound carrier signal, having a sampling rate of 96 kHz, generated by a carrier generation block 64.

This produces ultrasonic signal information at the sampling rate of 96 kHz, and so this is passed to a sample rate converter 65, where it is down-converted to a sampling rate of 48 kHz. The resulting signal can then be added to the source signal, at its sampling rate of 48 kHz, in the adder 36. The output of the adder 36 can then be transmitted over the communications link 60.

Therefore, in this embodiment, the input signal to the loudspeaker driver circuit 22, at the sampling rate of 48 kHz, is passed directly to the speaker protection block 40.

Figure 4:
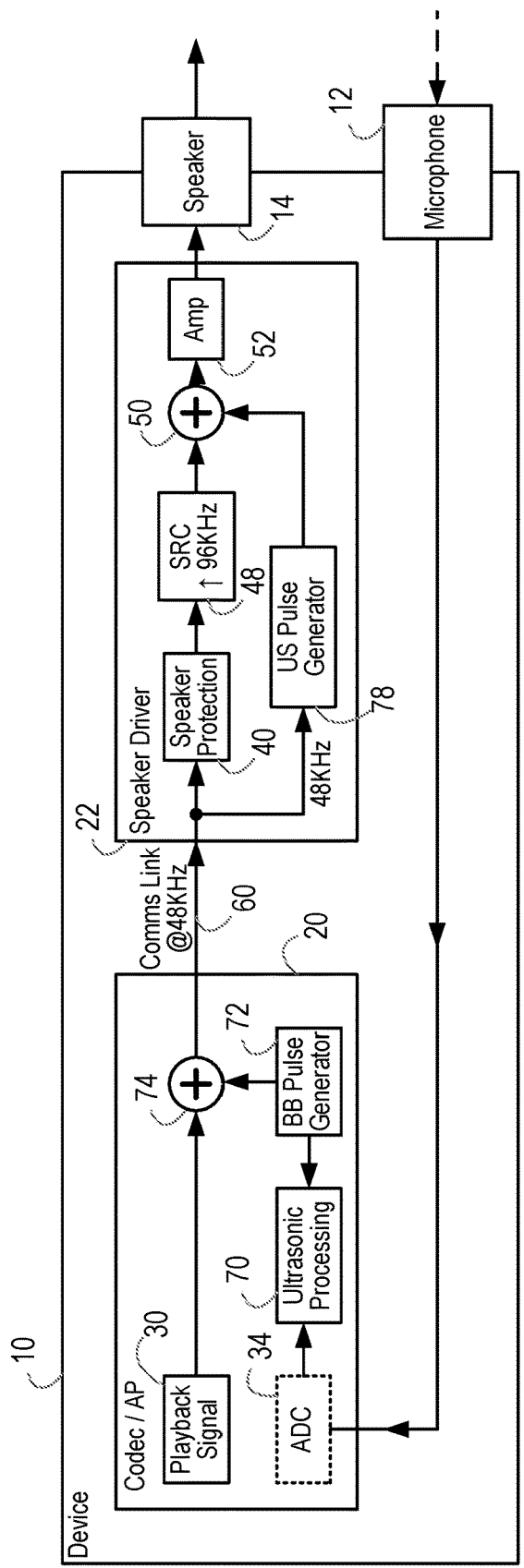
FIG. 4 is a schematic diagram, illustrating a further alternative embodiment of audio processing circuitry in the smartphone.

In addition, the input signal to the loudspeaker driver circuit 22 contains the information about the ultrasonic signal detected by the microphone 12, and this is passed to the ultrasonic processing module, more specifically a pulse extraction block 66, which extracts the information about the ultrasonic signal detected by the microphone 12, and passes this to the ultrasonic processing block 42. The signal generated by the ultrasonic pulse generator 44 is also passed to the ultrasonic processing block 42, which is therefore able to compare the transmitted signal with the detected reflected signal, in order to obtain useful information FIG. 4 illustrates an alternative embodiment of a part of an audio signal processing system in a device 10. The system shown in FIG. 4 is similar to that shown in FIG. 3, and components having the same functions are indicated by the same reference numerals.

In the embodiment shown in FIG. 4, the communications link 60 between the codec or applications processor 20, and the loudspeaker driver circuit 22, again operates at a sampling rate of 48 kHz.

In order to generate suitable ultrasonic signal information that can be transmitted at the sampling rate of 48 kHz, a baseband pulse is generated by a baseband pulse generator 72.

The playback signal from the source 30, and the baseband pulse generated by the baseband pulse generator 72 are applied to an adder 74.

Figure 5:
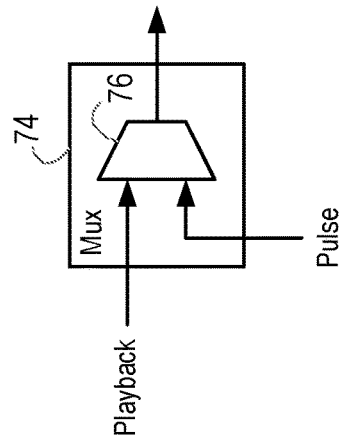
FIG. 5 illustrates in more detail a part of the circuitry of FIG. 4.

FIG. 5 shows in more detail the form of the adder 74. Specifically, in this example, the adder 74 includes a multiplexer 76, which adds the information from the source 30 and the baseband pulse generator 72.

Thus, in any of the embodiments described herein, the baseband pulse information could for example be added to the audio playback signal by time division multiplexing, or by inclusion as the least significant bit or the least significant bits of the audio playback signal.

The adder 74 produces a signal comprising ultrasonic signal information and the source signal, at its sampling rate of 48 kHz, and the output of the adder 74 can then be transmitted over the communications link 60.

Therefore, in this embodiment as in FIG. 3, the input signal to the loudspeaker driver circuit 22, at the sampling rate of 48 kHz, is passed directly to the speaker protection block 40.

In addition, the input signal to the loudspeaker driver circuit 22 contains the information for use in generating the ultrasonic signal within the loudspeaker driver circuit 22 and is passed to the ultrasonic processing module including an ultrasonic pulse generator 78.

Figure 6:
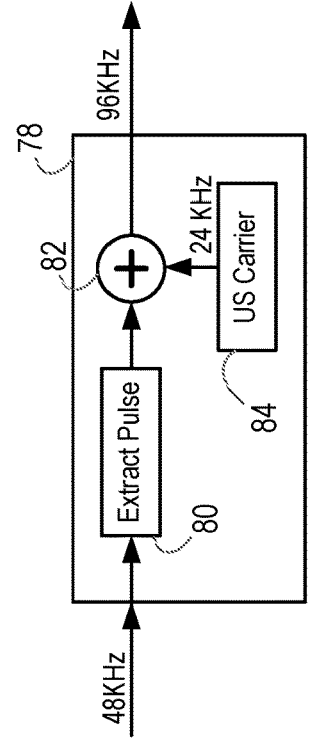
FIG. 6 illustrates in more detail another part of the circuitry of FIG. 4.

FIG. 6 shows in more detail the form of the ultrasonic pulse generator 78. Specifically, in this example, the ultrasonic pulse generator 78 includes a pulse extraction block 80, for extracting information about the baseband pulse from the input signal. This baseband pulse is applied to a mixer 82, where it is mixed with a 24 kHz ultrasonic carrier signal generated by a carrier generator 84.

The resulting ultrasonic pulse signal, at a sampling rate of 96 kHz, is then applied to the adder 50 and then to the amplifier 52.

In the processor 20, the baseband pulse generated by the baseband pulse generator 72 is passed to an ultrasonic processing block 70. In addition, the feedback signal from the microphone 12 that is coupled to the codec or applications processor 20 is passed to the optional analog-digital converter 34, and then to the ultrasonic processing block 70.

This allows the ultrasonic processing block 70 to compare the transmitted signal with the detected reflected signal, in order to obtain useful information.

Figure 7:
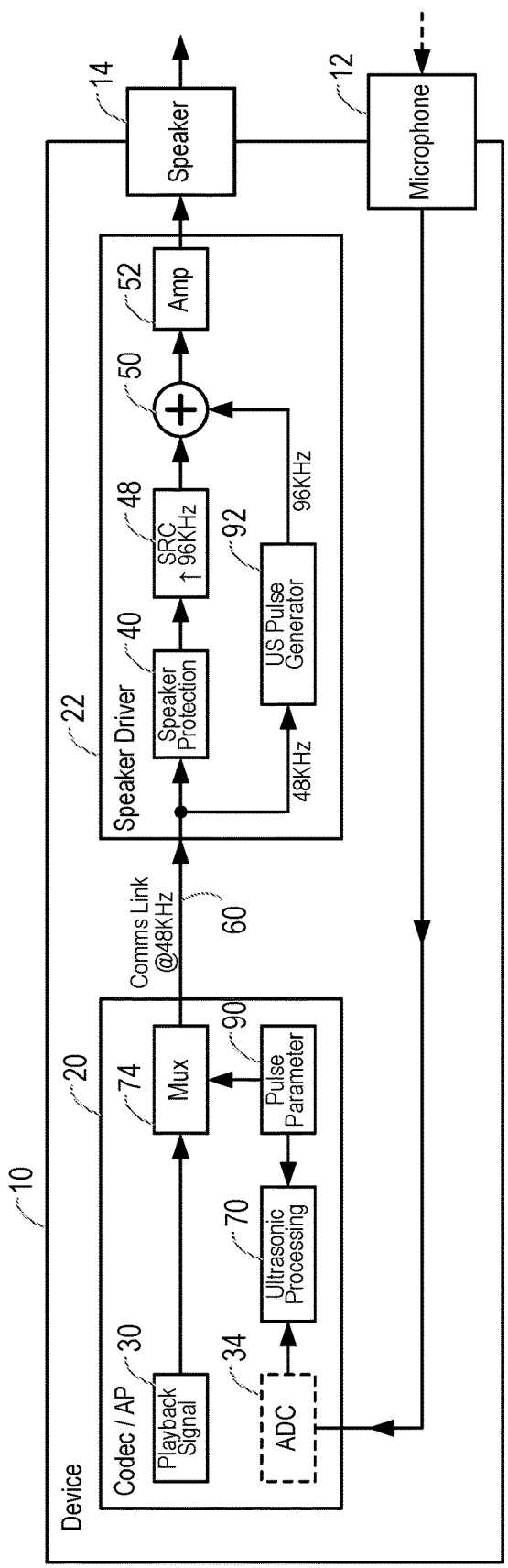
FIG. 7 is a schematic diagram, illustrating a further alternative embodiment of audio processing circuitry in the smartphone.

FIG. 7 illustrates an alternative embodiment of a part of an audio signal processing system in a device 10. The system shown in FIG. 7 is similar to that shown in FIG. 4, and components having the same functions are indicated by the same reference numerals.

In the embodiment shown in FIG. 7, the communications link 60 between the codec or applications processor 20, and the loudspeaker driver circuit 22, again operates at a sampling rate of 48 kHz.

In order to generate suitable ultrasonic signal information that can be transmitted at the sampling rate of 48 kHz, in this case, a pulse parameter generator 90 generates a parameter, number, or coefficient, or multiple parameters or coefficients, that can be used to generate a desired form of ultrasonic pulse.

The playback signal from the source 30, and the pulse information generated by the pulse parameter generator 90, are applied to an adder 74.

Figure 8:
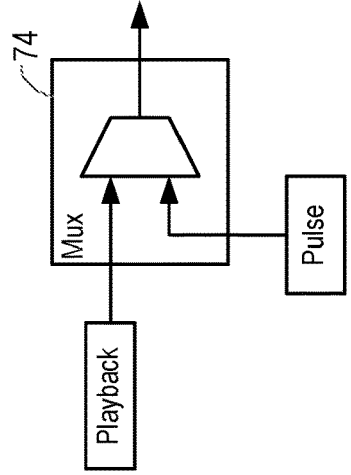
FIG. 8 illustrates in more detail a part of the circuitry of FIG. 7.

FIG. 8 shows in more detail the form of the adder 74. Specifically, in this example, the adder 74 includes a multiplexer 76, which adds the information from the source 30 and the pulse parameter generator 90.

The pulse information could for example be added to the audio playback signal by time division multiplexing, or by inclusion as the least significant bits of the audio playback signal.

The adder 74 produces a signal comprising ultrasonic signal information and the source signal, at its sampling rate of 48 kHz, and the output of the adder 74 can then be transmitted over the communications link 60.

Therefore, in this embodiment as in FIG. 3, the input signal to the loudspeaker driver circuit 22, at the sampling rate of 48 kHz, is passed directly to the speaker protection block 40.

In addition, the input signal to the loudspeaker driver circuit 22 contains the information for use in generating the ultrasonic signal within the loudspeaker driver circuit 22 and is passed to the ultrasonic processing module including an ultrasonic pulse generator 92.

Figure 9:
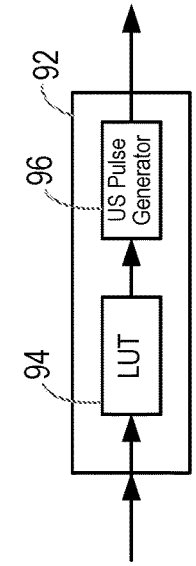
FIG. 9 illustrates in more detail another part of the circuitry of FIG. 7.

FIG. 9 shows in more detail the form of the ultrasonic pulse generator 92. Specifically, in this example, the ultrasonic pulse generator block 92 includes a look-up table (LUT) 94. The look-up table 94 can be addressed using the parameter, number, or coefficient, or multiple parameters or coefficients, generated by the pulse parameter generator 90.

The look-up table 94 stores, for each parameter, number or coefficient, information defining a form of an ultrasonic waveform, for example a pulse signal. However, any arbitrarily complex ultrasonic waveform can be generated from the information stored in the look-up table.

The information output from the look-up table 94 in response to the information contained in the input signal to the loudspeaker driver circuit 22 is passed to an ultrasonic pulse generator 96, which generates the intended ultrasonic signal. This ultrasonic signal is applied to the adder 50 and then to the amplifier 52.

In the processor 20, the pulse parameter information generated by the pulse parameter generator 90 is passed to an ultrasonic processing block 70. In addition, the feedback signal from the microphone 12 that is connected to the codec or applications processor 20 is passed to the optional analog-digital converter 34, and then to the ultrasonic processing block 70.

This allows the ultrasonic processing block 70 to compare the transmitted signal with the detected reflected signal, in order to obtain useful information.

Figure 10:
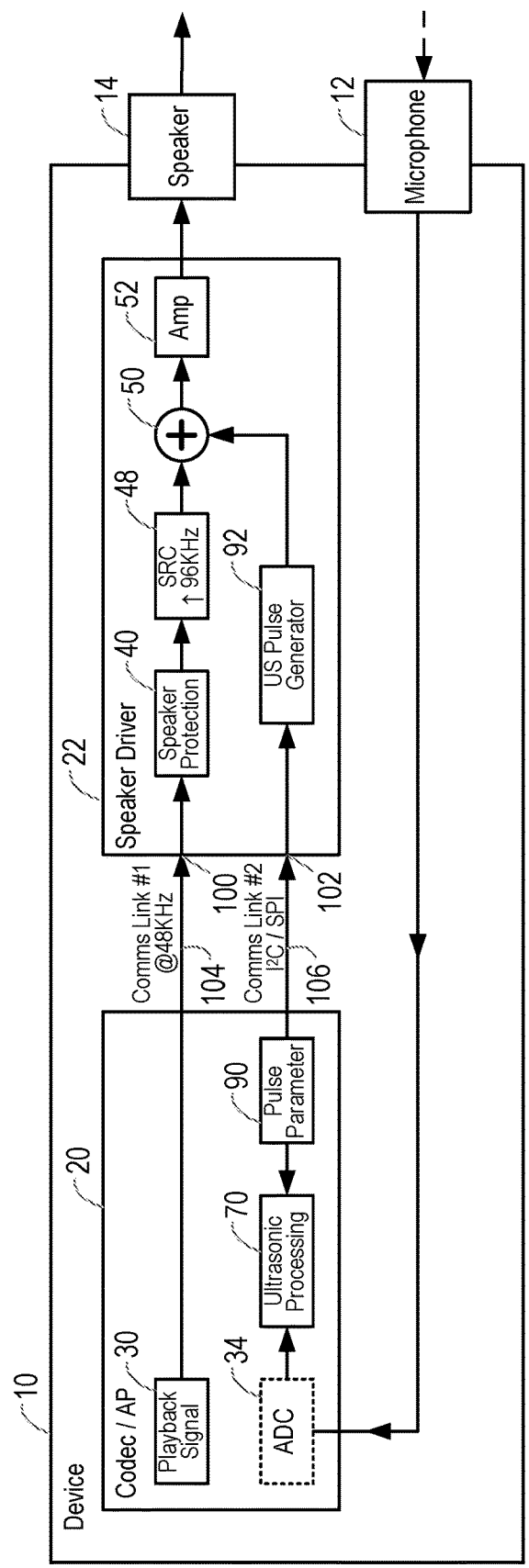
FIG. 10 is a schematic diagram, illustrating a further alternative embodiment of audio processing circuitry in the smartphone.

FIG. 10 illustrates an alternative embodiment of a part of an audio signal processing system in a device 10. The system shown in FIG. 10 is similar to that shown in FIG. 7, and components having the same functions are indicated by the same reference numerals.

As in FIG. 7, in order to generate suitable ultrasonic signal information, a pulse parameter generator 90 generates a parameter, number, or coefficient, or multiple parameters or coefficients, that can be used to generate a desired form of ultrasonic pulse.

In this embodiment, the loudspeaker driver circuit 22 has a first input 100 connected to the loudspeaker protection module 40 for receiving a first component of the input signal and a second input 102 connected to the ultrasonic processing module for receiving a second component of the input signal.

Thus, the playback signal from the source 30 is transmitted over a first communications link 104 to the first input 100 of the loudspeaker driver circuit 22. The output of the pulse parameter generator 90 is transmitted over a second communications link 106 to the second input 102 of the loudspeaker driver circuit 22, and forms the second component of the input signal of the loudspeaker driver circuit 22.

In the embodiment shown in FIG. 10, the communications link 104 between the codec or applications processor 20, and the loudspeaker driver circuit 22, again operates at a sampling rate of 48 kHz.

The second communications link 106 may for example be an I²C bus or an SPI bus.

The ultrasonic pulse generator block 92 again has a form as shown in FIG. 9. Thus, the ultrasonic pulse generator block 92 includes a look-up table 94. The look-up table 94 can be addressed using the parameter, number, or coefficient, or multiple parameters or coefficients, generated by the pulse parameter generator 90.

The look-up table 94 stores, for each parameter, number or coefficient, information defining a form of an ultrasonic pulse signal.

The information output from the look-up table 94 in response to the information contained in the input signal to the loudspeaker driver circuit 22 is passed to an ultrasonic pulse generator 96, which generates the intended ultrasonic signal. This ultrasonic signal is applied to the adder 50 and then to the amplifier 52.

In the processor 20, the pulse parameter information generated by the pulse parameter generator 90 is passed to an ultrasonic processing block 70. In addition, the feedback signal from the microphone 12 that is connected to the codec or applications processor 20 is passed to the optional analog-digital converter 34, and then to the ultrasonic processing block 70.

This allows the ultrasonic processing block 70 to compare the transmitted signal with the detected reflected signal, in order to obtain useful information.

FIG. 10 therefore shows an embodiment in which the loudspeaker driver circuit 22 has two inputs, each receiving a respective component of the input signal, and in this embodiment, the information that is supplied to the ultrasonic processing module for generating the ultrasonic signal in response to the input signal comprises parameter information as described with reference to FIGS. 7 and 8.

However, in another embodiment, the loudspeaker driver circuit 22 again has two inputs, each receiving a respective component of the input signal, and in this other embodiment, the information that is supplied to the ultrasonic processing module for generating the ultrasonic signal in response to the input signal comprises pulse information as described with reference to FIGS. 4 and 5.

Figure 11:
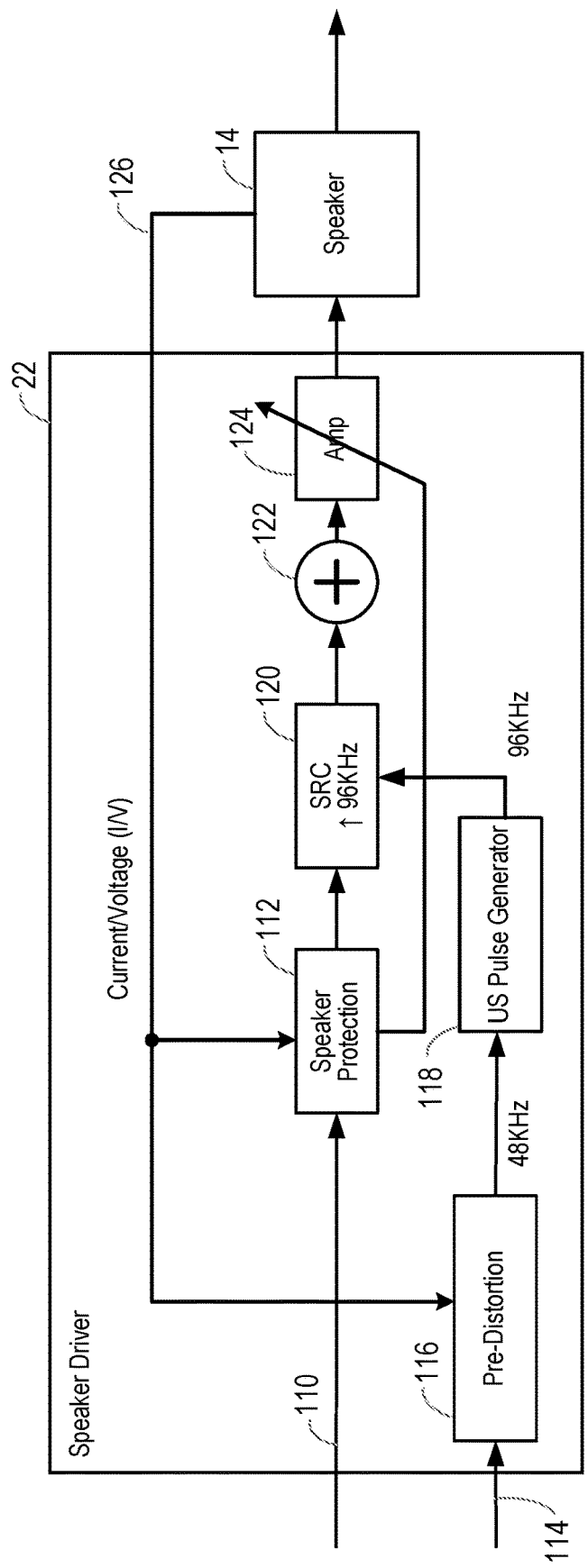
FIG. 11 is a schematic diagram, illustrating a modification that can be applied to embodiments of the audio processing circuitry.

FIG. 11 illustrates a further modification of the loudspeaker driver circuit 22, which can be applied to any of the embodiments described above.

In this modification, an input signal, or a first component of an input signal, 110 is applied to an input of an adaptive loudspeaker protection module 112. The input signal, or a second component of the input signal, 114, is applied to a pre-distortion block 116, and the output thereof is applied to an ultrasonic processing module 118.

The modified signal output by the loudspeaker protection module 112 is applied to a sample rate converter block 120, for increasing the sample rate thereof to 96 kHz. The output of the ultrasonic processing module 118 and of the sample rate converter block 120 are applied to an adder, and the output of the adder is applied to the amplifier 124 before being supplied to drive the loudspeaker 14.

In this embodiment, feedback is provided from the loudspeaker 14, in the form of current and/or voltage signals 126, which can be used to determine the operating properties of the loudspeaker 14. For example, the feedback signal 126 can be used to determine whether the loudspeaker excursion is excessive, if the temperature of the loudspeaker is too high, or whether any other problem is occurring or in danger of occurring.

The feedback signals 126 are therefore applied to the loudspeaker protection module 112 and/or the pre-distortion block 116, in order to modify the audio signal and/or the ultrasound signal that is applied to the loudspeaker 14. For example, the modification may be used to compensate for any non-linearities in the system. That is, the feedback signals 126 can be used to determine the linearity of the system, and the ultrasound signal can be pre-distorted to compensate for any such non-linearity.

One possible form of modification that can be made in response to the feedback signals 126 is to adjust the gain of the amplifier 124.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog TM or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A loudspeaker driver circuit, comprising:
at least one input for receiving an input signal;
a loudspeaker protection module coupled to the input for receiving the input signal and for generating a modified signal in response to the input signal;
an amplifier coupled to receive the modified signal from the loudspeaker protection module and to generate an output signal;
an output for outputting the output signal for driving a speaker; and
an ultrasonic signal generator, for generating an ultrasonic signal, wherein the ultrasonic signal generator is coupled to the amplifier for applying the ultrasonic signal thereto;
wherein the loudspeaker protection module is configured to operate at a first sample rate and the ultrasonic processing module is configured to operate at a second sample rate that is higher than the first sample rate, and the loudspeaker driver circuit further comprises a first sample rate converter, coupled to the loudspeaker protection module for receiving the modified signal and for increasing the sample rate thereof to the second sample rate.

2. A loudspeaker driver circuit as claimed in claim 1, further comprising:
a second sample rate converter, coupled to the loudspeaker protection module for receiving the input signal at the second sample rate and for decreasing the sample rate thereof to the first sample rate.

3. A loudspeaker driver circuit as claimed in claim 1, further comprising an adder coupled to receive the modified signal from the loudspeaker protection module and to receive the ultrasonic signal, and to form a summed signal therefrom, and the adder being coupled to the amplifier for applying the summed signal thereto.

4. A loudspeaker driver circuit as claimed in claim 1, in the form of a single integrated circuit.

5. A device comprising a loudspeaker driver circuit as claimed in claim 1.

6. A device as claimed in claim 5, comprising a mobile telephone, an audio player, a video player, a mobile computing platform, a games device, a remote controller device, a toy, a machine, or a home automation controller or a domestic appliance.

7. A loudspeaker driver circuit, comprising:
at least one input for receiving an input signal;
a loudspeaker protection module coupled to the input for receiving the input signal and for generating a modified signal in response to the input signal;
an amplifier coupled to receive the modified signal from the loudspeaker protection module and to generate an output signal;
an output for outputting the output signal for driving a speaker;
an ultrasonic signal generator, for generating an ultrasonic signal, wherein the ultrasonic signal generator is coupled to the amplifier for applying the ultrasonic signal thereto; and
a single input connected to the loudspeaker protection module and to the ultrasonic signal generator for receiving a single input signal;
wherein the ultrasonic signal generator is configured to extract ultrasonic signal information from the single input signal, and to generate the ultrasonic signal in response to the ultrasonic signal information extracted from the input signal.

8. A loudspeaker driver circuit as claimed in claim 7, wherein the ultrasonic signal generator is configured to extract ultrasonic signal information from the single input signal by time division demultiplexing.

9. A loudspeaker driver circuit as claimed in claim 7, wherein the ultrasonic signal generator is configured to extract ultrasonic signal information from least significant bits of the single input signal.

10. A loudspeaker driver circuit as claimed in claim 7, wherein the ultrasonic signal generator comprises a mixer, for combining the ultrasonic signal information with an ultrasonic carrier signal for generating the ultrasonic signal.

11. A loudspeaker driver circuit as claimed in claim 7, wherein the ultrasonic signal generator comprises:
a look-up table that can be addressed by the ultrasonic signal information to produce ultrasonic pulse information, and
a pulse generator, for generating the ultrasonic signal in response to the ultrasonic pulse information.

12. A loudspeaker driver circuit as claimed in claim 7, further comprising an adder coupled to receive the modified signal from the loudspeaker protection module and to receive the ultrasonic signal, and to form a summed signal therefrom, and the adder being coupled to the amplifier for applying the summed signal thereto.

13. A loudspeaker driver circuit as claimed in claim 7, in the form of a single integrated circuit.

14. A device comprising a loudspeaker driver circuit as claimed in claim 7.

15. A device as claimed in claim 14, comprising a mobile telephone, an audio player, a video player, a mobile computing platform, a games device, a remote controller device, a toy, a machine, or a home automation controller or a domestic appliance.

16. A loudspeaker driver circuit, comprising:
at least one input for receiving an input signal;
a loudspeaker protection module coupled to the input for receiving the input signal and for generating a modified signal in response to the input signal;
an amplifier coupled to receive the modified signal from the loudspeaker protection module and to generate an output signal;
an output for outputting the output signal for driving a speaker;
an ultrasonic signal generator, for generating an ultrasonic signal, wherein the ultrasonic signal generator is coupled to the amplifier for applying the ultrasonic signal thereto; and
a first input connected to the loudspeaker protection module for receiving a first component of the input signal and a second input connected to the ultrasonic signal generator for receiving a second component of the input signal;
wherein the second component of the input signal comprises ultrasonic signal information, and
wherein the ultrasonic signal generator is configured to generate the ultrasonic signal in response to the ultrasonic signal information.

17. A loudspeaker driver circuit as claimed in claim 16, further comprising an adder coupled to receive the modified signal from the loudspeaker protection module and to receive the ultrasonic signal, and to form a summed signal therefrom, and the adder being coupled to the amplifier for applying the summed signal thereto.

18. A loudspeaker driver circuit as claimed in claim 16, in the form of a single integrated circuit.

19. A device comprising a loudspeaker driver circuit as claimed in claim 16.

20. A device as claimed in claim 19, comprising a mobile telephone, an audio player, a video player, a mobile computing platform, a games device, a remote controller device, a toy, a machine, or a home automation controller or a domestic appliance.

21. A loudspeaker driver circuit, comprising:
at least one input for receiving an input signal;
a loudspeaker protection module coupled to the input for receiving the input signal and for generating a modified signal in response to the input signal;
an amplifier coupled to receive the modified signal from the loudspeaker protection module and to generate an output signal;
an output for outputting the output signal for driving a speaker;
an ultrasonic signal generator, for generating an ultrasonic signal, wherein the ultrasonic signal generator is coupled to the amplifier for applying the ultrasonic signal thereto; and
an ultrasound processing module,
wherein the ultrasound processing module is coupled to the ultrasonic signal generator, for receiving information about the generated ultrasonic signal,
wherein the ultrasound processing module is coupled to the at least one input for receiving information about an ultrasonic echo signal in said input signal, and
wherein the ultrasound processing module is configured to obtain information from the received information about the generated ultrasonic signal and the received information about the ultrasonic echo signal.

22. A loudspeaker driver circuit as claimed in claim 21, further comprising an adder coupled to receive the modified signal from the loudspeaker protection module and to receive the ultrasonic signal, and to form a summed signal therefrom, and the adder being coupled to the amplifier for applying the summed signal thereto.

23. A loudspeaker driver circuit as claimed in claim 21, in the form of a single integrated circuit.

24. A device comprising a loudspeaker driver circuit as claimed in claim 21.

25. A device as claimed in claim 24, comprising a mobile telephone, an audio player, a video player, a mobile computing platform, a games device, a remote controller device, a toy, a machine, or a home automation controller or a domestic appliance.

26. A loudspeaker driver circuit, comprising:
at least one input for receiving an input signal;
a loudspeaker protection module coupled to the input for receiving the input signal and for generating a modified signal in response to the input signal;
an amplifier coupled to receive the modified signal from the loudspeaker protection module and to generate an output signal;
an output for outputting the output signal for driving a speaker;
an ultrasonic signal generator, for generating an ultrasonic signal, wherein the ultrasonic signal generator is coupled to the amplifier for applying the ultrasonic signal thereto; and
a feedback input for receiving a feedback signal from a speaker driven by the output signal, wherein operation of the loudspeaker protection module is adapted in response to the feedback signal.

27. A loudspeaker driver circuit as claimed in claim 26, further comprising an adder coupled to receive the modified signal from the loudspeaker protection module and to receive the ultrasonic signal, and to form a summed signal therefrom, and the adder being coupled to the amplifier for applying the summed signal thereto.

28. A loudspeaker driver circuit as claimed in claim 26, in the form of a single integrated circuit.

29. A device comprising a loudspeaker driver circuit as claimed in claim 26.

30. A device as claimed in claim 29, comprising a mobile telephone, an audio player, a video player, a mobile computing platform, a games device, a remote controller device, a toy, a machine, or a home automation controller or a domestic appliance.

31. A loudspeaker driver circuit, comprising:
at least one input for receiving an input signal;
a loudspeaker protection module coupled to the input for receiving the input signal and for generating a modified signal in response to the input signal;
an amplifier coupled to receive the modified signal from the loudspeaker protection module and to generate an output signal;

an output for outputting the output signal for driving a speaker;

an ultrasonic signal generator, for generating an ultrasonic signal, wherein the ultrasonic signal generator is coupled to the amplifier for applying the ultrasonic signal thereto; and a feedback input for receiving a feedback signal from a speaker driven by the output signal, wherein the ultrasonic signal generator is configured to extract ultrasonic signal information from an input signal of the loudspeaker driver circuit, and wherein generation of the ultrasonic signal is adapted in response to the feedback signal.

32. A loudspeaker driver circuit as claimed in claim 31, further comprising an adder coupled to receive the modified signal from the loudspeaker protection module and to receive the ultrasonic signal, and to form a summed signal therefrom, and the adder being coupled to the amplifier for applying the summed signal thereto.

33. A loudspeaker driver circuit as claimed in claim 31, in the form of a single integrated circuit.

34. A device comprising a loudspeaker driver circuit as claimed in claim 31.

35. A device as claimed in claim 34, comprising a mobile telephone, an audio player, a video player, a mobile computing platform, a games device, a remote controller device, a toy, a machine, or a home automation controller or a domestic appliance.

36. An audio processor circuit, comprising:

a source of an audio signal;

at least one output for connection to a loudspeaker driver circuit;

an input for receiving a signal representing an echo of an ultrasonic signal generated in response to an output of the loudspeaker driver circuit; and an ultrasonic information generator, for generating ultrasonic information that can be used by an ultrasonic processing module for generating an ultrasonic signal in response thereto, wherein the ultrasonic information generator is configured for generating said ultrasonic information based on the received signal representing the echo of the ultrasonic signal, and wherein the audio signal and the ultrasonic information are applied to the at least one output.

37. A device comprising an audio processor circuit as claimed in claim 36.

38. A device as claimed in claim 36, comprising a mobile telephone, an audio player, a video player, a mobile computing platform, a games device, a remote controller device, a toy, a machine, or a home automation controller or a domestic appliance.

* * * * *